(12) United States Patent
Konig et al.

(10) Patent No.: US 8,719,298 B2
(45) Date of Patent: May 6, 2014

(54) CLICK-THROUGH PREDICTION FOR NEWS QUERIES

(75) Inventors: Arnd Christian Konig, Kirkland, WA (US); Michael Gamon, Seattle, WA (US); Qiang Wu, Sammamish, WA (US); Roger P. Menezes, Kirkland, WA (US); Monwhea Jeng, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 12/469,692

(22) Filed: May 21, 2009

(65) Prior Publication Data

US 2010/0299350 A1 Nov. 25, 2010

(51) Int. Cl.
*G06F 17/30* (2006.01)

(52) U.S. Cl.
USPC ............................ 707/771; 707/706; 707/708

(58) Field of Classification Search
USPC .......................................... 707/708, 706, 771
See application file for complete search history.

(56) References Cited

U.S. PATENT DOCUMENTS

| | | | |
|---|---|---|---|
| 2007/0005568 A1* | 1/2007 | Angelo et al. ..................... 707/3 |
| 2007/0081197 A1* | 4/2007 | Omoigui ....................... 358/403 |
| 2007/0100817 A1* | 5/2007 | Acharya et al. ................... 707/5 |
| 2007/0156514 A1 | 7/2007 | Wright et al. |
| 2007/0156621 A1 | 7/2007 | Wright et al. |
| 2008/0021860 A1* | 1/2008 | Wiegering et al. ................. 707/1 |
| 2008/0195596 A1 | 8/2008 | Sisk et al. |
| 2008/0249832 A1 | 10/2008 | Richardson et al. |
| 2008/0250033 A1 | 10/2008 | Agarwal et al. |
| 2008/0255935 A1* | 10/2008 | Madhavan et al. .............. 705/14 |
| 2009/0006284 A1 | 1/2009 | Liu et al. |
| 2009/0037402 A1 | 2/2009 | Jones et al. |
| 2009/0055359 A1* | 2/2009 | Gross ................................ 707/3 |
| 2009/0112781 A1* | 4/2009 | Heath et al. ..................... 706/21 |
| 2009/0157651 A1* | 6/2009 | Tomkins et al. .................. 707/5 |
| 2009/0265328 A1* | 10/2009 | Parekh et al. ..................... 707/5 |
| 2010/0114954 A1* | 5/2010 | Sareen et al. ................. 707/776 |
| 2010/0161591 A1* | 6/2010 | Jones et al. ................... 707/722 |
| 2010/0169441 A1* | 7/2010 | Lafleur et al. ................. 709/206 |

OTHER PUBLICATIONS

Diaz, Fernando, "Integration of News Content into Web Results", Second ACM International Conference on Web Search and Data Mining, Retrieved at <<http://ciir.cs.umass.edu/~fdiaz/fdiaz-wsdm2009.pdf>>, Feb. 9-2, 2009, pp. 10.

Wu, et al., "Keyword Extraction for Contextual Advertisement", The 17th International World Wide Web Conference, Retrieved at <<http://www2008.org/papers/pdf/p1195-wu.pdf>>, Apr. 21-25, 2008, pp. 1195-1196.

(Continued)

*Primary Examiner* — Mahesh Dwivedi
(74) *Attorney, Agent, or Firm* — Steve Wight; Carole Boelitz; Micky Minhas

(57) ABSTRACT

Described is estimating whether an online search query is a news-related query, and if so, outputting news-related results in association with other search results returned in response to the query. The query is processed into features, including by accessing corpora that corresponds to relatively current events, e.g., recently crawled from news and blog articles. A corpus of static reference data, such as an online encyclopedia, may be used to help determine whether the query is less likely to be about current events. Features include frequency-related data and context-related data corresponding to frequency and context information maintained in the corpora. Additional features may be obtained by processing text of the query itself, e.g., "query-only" features.

19 Claims, 4 Drawing Sheets

(56) References Cited

OTHER PUBLICATIONS

Lifshits, et al., "Estimation of the Click Volume by Large Scale Regression Analysis", Lecture Notes in Computer Science,Computer Science—Theory and Applications, Retrieved at <<http://www.springerlink.com/content/615q962t61254j60/fulltext.pdf>>, vol. 4649, Aug. 22, 2007, pp. 216-226.

Carterette, et al., "Evaluating Search Engines by Modeling the Relationship between Relevance and Clicks", In Advances in Neural Information Processing Systems, Retrieved at <<http://citeseerx.ist.psu.edu/viewdoc/download?doi=10.1.1.68.3134&rep=rep1&type=pdf>>, vol. 20, Dec. 4-9, 2007, pp. 1-8.

"Online Models for Content Optimization", Retrieved at <<research.yahoo.com/files/paper_contentoptimization.pdf>>, pp. 1-8.

Agichtein, et al., "Improving Web Search Ranking by Incorporating User Behavior Information", Proceedings of the 29th annual international ACM SIGIR conference on Research and development in information retrieval, Retrieved at <<http://www.mathcs.emory.edu/~eugene/papers/sigir2006ranking.pdf>>, Aug. 6-11, 2006, pp. 8.

Burges, et al., "Learning to Rank using Gradient Descent", Proceedings of the 22nd International Conference on Machine Learning, Retrieved at <<http://research.microsoft.com/en-us/um/people/cburges/papers/icml_ranking.pdf>>, Aug. 7-11, 2005, pp. 8.

Chakrabarti, et al., "Contextual Advertising by Combining Relevance with Click Feedback", The 17th International World Wide Web Conference, Retrieved at <<http://www.cs.cmu.edu/~deepay/mywww/papers/www08-interaction.pdf>>, Apr. 21-25, 2008, pp. 10.

Del Corso, et al., "Ranking a Stream of News", Proceedings of the 14th international conference on World Wide Web, Retrieved at <<http://www2005.org/cdrom/docs/p97.pdf>>, May 10-14, 2005, pp. 97-106.

Das, et al., "Google News Personalization: Scalable Online Collaborative Filtering", Proceedings of the Sixteenth International World Wide Web Conference, Retrieved at <<http://www2007.org/papers/paper570.pdf>>, May 8-12, 2007, pp. 271-280.

Friedman, Jerome H., "Greedy Function Approximation: A Gradient Boosting Machine", Technical Discussion: Foundations of TreeNet(tm), Retrieved at <<http://www.salford-systems.com/doc/GreedyFuncApproxSS.pdf>>, Feb. 24, 1999, pp. 1-34.

Henzinger, et al., "Query-Free News Search", Proceedings of the Twelfth International World Wide Web Conference, Retrieved at <<http://www.henzinger.com/monika/mpapers/p707-henzinger.ps>>, May 20-24, 2003, pp. 10.

Jayram, et al., "Cell-Probe Lower Bounds for the Partial Match Problem", Proceedings of the thirty-fifth annual ACM symposium on Theory of computing, Retrieved at <<http://www.cs.technion.ac.il/~rabani/Papers/JayramKKR-JCSS-revised.pdf>>, Jun. 9-11, 2003 pp. 1-13.

Jones, et al., "A Probabilistic Model of Information Retrieval: Development and Comparative Experiments", Retrieved at <<http://wing.comp.nus.edu.sg/~sigir/irpapers/pmir-pt1.pdf>>, Jan. 2000, pp. 1-35.

Li, et al., "Using Sketches to Estimate Two-Way and Multi-Way Associations", MSR-TR-2005-115, Retrieved at <<ftp://ftp.research.microsoft.com/pub/tr/TR-2005-115.pdf>>, Sep. 2005, pp. 1-67.

Li, et al., "Learning Query Intent from Regularized Click Graphs", 31st Annual International ACM SIGIR conference on Research and Development in Information Retrieval, Retrieved at <<http://research.microsoft.com/pubs/75219/2008-Li-sigIR.pdf>>, Jul. 20-24, 2008, pp. 8.

Lin, Jianhua, "Divergence Measures based on the Shannon Entropy", IEEE Transactions on Information Theory, Retrieved at <<http://www.cise.ufl.edu/~anand/sp06/jensen-shannon.pdf>>, vol. 37, No. 1, Jan. 1991, pp. 145-151.

Manning, et al., "Foundations of Statistical Natural Language Processing", MIT Press, Retrieved at <<http://www.sigmod.org/record/issues/0209/b2.weikum.pdf>>, May 1999, pp. 2.

Navarro, et al., "Compressed Full-Text Indexes", ACM Computing Surveys, Retrieved at <<http://www.cs.helsinki.fi/u/vmakinen/papers/survey.pdf>>, vol. 39, No. 1, 2007, pp. 1-66.

Radlinski, et al., "Active Exploration for Learning Rankings from Clickthrough Data", The Thirteenth ACM SIGKDD International Conference on Knowledge Discovery and Data Mining, Retrieved at <<http://radlinski.org/papers/Radlinski07ActiveRanking.pdf>>, Aug. 12-15, 2007, pp. 1-10.

Regelson, et al., "Predicting Click-Through Rate using Keyword Clusters", Seventh ACM Conference on Electronic Commerce, Retrieved at <<http://www.business.ualberta.ca/kasdemir/ssa2/regelson_fain.pdf>>, Jun. 11, 2006, pp. 6.

Richardson, et al., "Predicting Clicks: Estimating the Click-Through Rate for New Ads", The 16th International World Wide Web Conference, Retrieved at <<http://websense.korea.ac.kr/projects/ads/predicting_clicks.pdf>>, Oct. 12, 2007, pp. 21.

Sifry, Dave, "State of the Live Web", Retrieved at <<http://technorati.com/weblog/2007/04/328.html>>, Apr. 5, 2007, pp. 1-8.

"State of the Blogosphere 2008", Retrieved at <<http://technorati.com/blogging/state-of-the-blogosphere/>>, Mar. 9, 2009, pp. 1-5.

* cited by examiner

CLICK-THROUGH PREDICTION FOR NEWS QUERIES

BACKGROUND

A growing trend in search engine technology is the display of specialized content such as news, products and the like that are associated in some way (e.g., interleaved) with traditional web search results. In general, this content should be displayed only when highly relevant to the search query, as it competes for space with additional search results and advertisements.

One measure of the relevance of specialized content to a search query is the click-through rate, corresponding to how often a link to the specialized content is clicked when displayed. For some types of queries for which specialized content has been displayed enough times, the click-through rate can be tracked. However, this does not work well when dealing with a query for which the click-through rate is not known, such as news queries which tend to be about current events and are ever changing over time. Further, it is generally not desirable to put anything that may be irrelevant on a results page just for the purpose of collecting click-through data, as irrelevant results tend to annoy users.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a query is processed to estimate whether the query is a news-related query, including by accessing data that corresponds to relatively current news. To this end, features related to the query are extracted, and used by a trained classifier to make the estimation. If the estimation (e.g., a probability value corresponding to a predicted click-through rate) is sufficiently high, then specialized content (e.g., one or more news results) are output with the other search results in response to the query.

In one aspect, the features comprise frequency-related data and context-related data corresponding to frequency and context information maintained in various corpora. Additional features are obtained by processing text of the query itself, e.g., "query-only" features.

In one implementation, the corpora contain information crawled from one or more sources of relatively current events, such as news and blog articles. These corpora are regularly updated to ensure that their data used for feature extraction is relatively current. Further, a corpus of reference data, such as an online encyclopedia, may be used to determine whether a query is more likely seeking general information (and is thus less likely to be a news-related query).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards determining whether to display that news result in association with other query results and/or advertisements. In one aspect, this is accomplished by estimating a click-through rate relative to a news result for an incoming query, and the using the estimated click-through rate to make the determination of the query's intent with respect to news. This includes prediction of the click-through rate for queries for which no news results have been displayed in the past or which have not been observed before.

As will be understood, the technology described herein quickly adapts to changing news events via a supervised learning framework. This includes considering the dependence between the time a query is issued and the likelihood of a displayed news result receiving a click, as to be valuable to users, the technology needs to adapt as some events quickly become newsworthy while other events cease to be newsworthy. Moreover, the technology predicts actual click-through rate-values (as opposed to a binary decision based upon a news or/no-news classification). At the same time, because the click-through rate is predicted online as queries arrive at the search engine, the prediction needs to be relatively fast.

While the examples described herein are primarily directed towards news-related queries and results, it is understood that other types of queries and specialized results may benefit from the technology described herein, such as to provide advertisements for queries about a suddenly popular product or service. Further, while corpora in the form of various data stores (each a different corpus) are used as examples that are accessed to make a prediction, other types of data stores may be used instead of or in addition to those exemplified herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and online searching in general.

Figure 1:
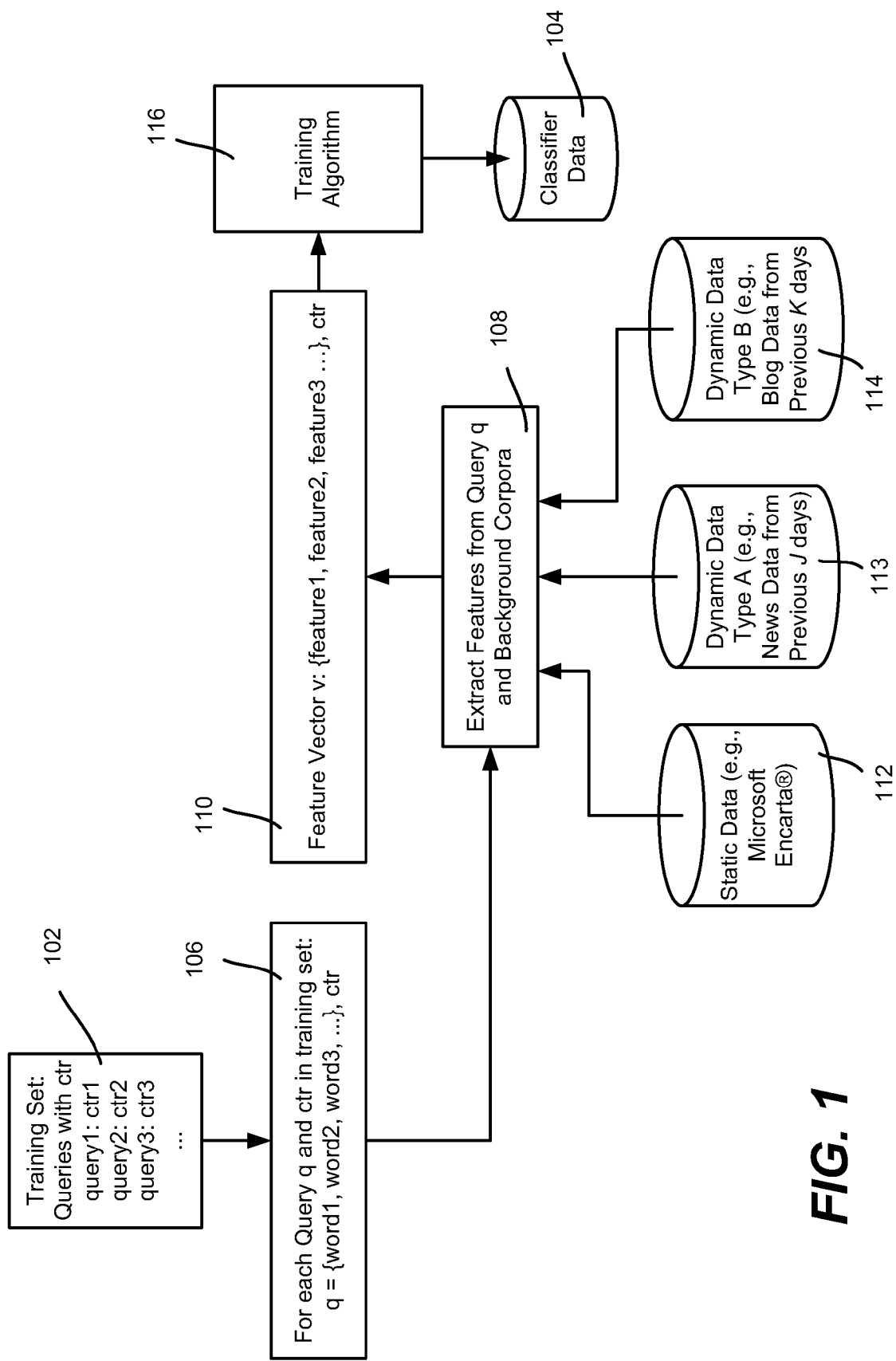
FIG. 1 is a block diagram representing example components for training a classifier to determine whether a query is intended to be a query seeking news.

Turning to FIG. 1, there is shown a training environment that processes a training set 102 into classifier data 104, which an online classifier 232 (FIG. 2) later uses to predict click-through rate for a news result with respect to a query. As can be seen, the training set 102 comprises a set of queries along with the click through information for those queries, e.g., obtained from a web search engine. In one implementation, the training set 102 contains web search queries for which news results were displayed, and, for each individual "impression" (each single time a news result was shown) the information whether a click on the news result occurred or not. Note that some minimum number of impressions (e.g., at least fifty in a given day) may be used as a filtering criterion as to whether a query is to be used in training.

For each word in the query and its click-through data, as represented by block 106, a feature extraction mechanism 108 extracts features in the form of feature vectors 110 for those words. Note that as used herein, the words of a query that are selected may not be the full set, e.g., stop-words or the like may be filtered out. Further, a "word" as used herein is not necessarily a single word, but may contain multiple terms, e.g., "presidential election" may be considered a word.

Extraction of the features and example features are described below, but in general, the features include data reflecting how current each word in a query is with respect to news events. Such features are obtained by accessing corpora 112-114 in the form of various data stores. Example data stores shown in FIG. 1 include a static data store 112, and two dynamic data stores 113 and 114, one containing recent news data (data store 113) and one containing recent blog data (data store 114). Other features include those within the query itself, that is, features computed directly from the query's text, without consulting any background or current event corpora; these are referred to herein as query-only features.

The feature vectors 110 are then used by a training algorithm 116 to train the classifier data 104. Training is also described below.

Regarding the corpora, when trying to determine the intent of a query, and more particularly whether it is about current news and events, actual current news and events need to be used. To capture changes in query intent resulting from recent news events, different corpora are used to determine which news events are drawing attention at any point in time. One corpus that may be used for this purpose is the data store 113 of news articles. To keep the articles current, the news articles may be limited (when building the corpus itself or by date-based filtering of a larger corpus) to those from the time the query was issued to some number J (e.g., seven) of days in the past.

Another example corpus (the data store 114) is based upon a large set of blog posts crawled over some period of time (e.g., K days back, where K may be the same as J) is accessed. In general, social media provides interesting information about the current topics and events.

News and blog corpora are used in one implementation because current events are regularly in flux, and temporal changes in the frequency of terms can indicate the emergence of a news story. Note that news and blog corpora complement each other in that some emerging news stories will result in "keyword spikes" in one corpus, but not the other, depending on a given topic, which makes blog posts an interesting and complementary source of information.

The news and blog corpora are acquired using dedicated news and blog crawling engines, which are known in the art. For blogs, the crawler uses the ping/feed mechanism of blogs to identify new blog posts in a timely manner, combined with additional parsing and crawling of the permalink found in the feed to deal with partial feeds.

A background corpus (the data store 112) is also accessed, because in general it contains relevant information, but its contents are generally not directed towards current events. An example of one such corpus is an online encyclopedia (e.g., Microsoft® Encarta®) or other source of reference-type data. Such a corpus provides additional evidence when compared to blog and news data. For example, if query terms are salient in the background corpus, but not salient in recent news and blog posts, the query is more likely to be a general information query than a news-related query.

Figure 2:
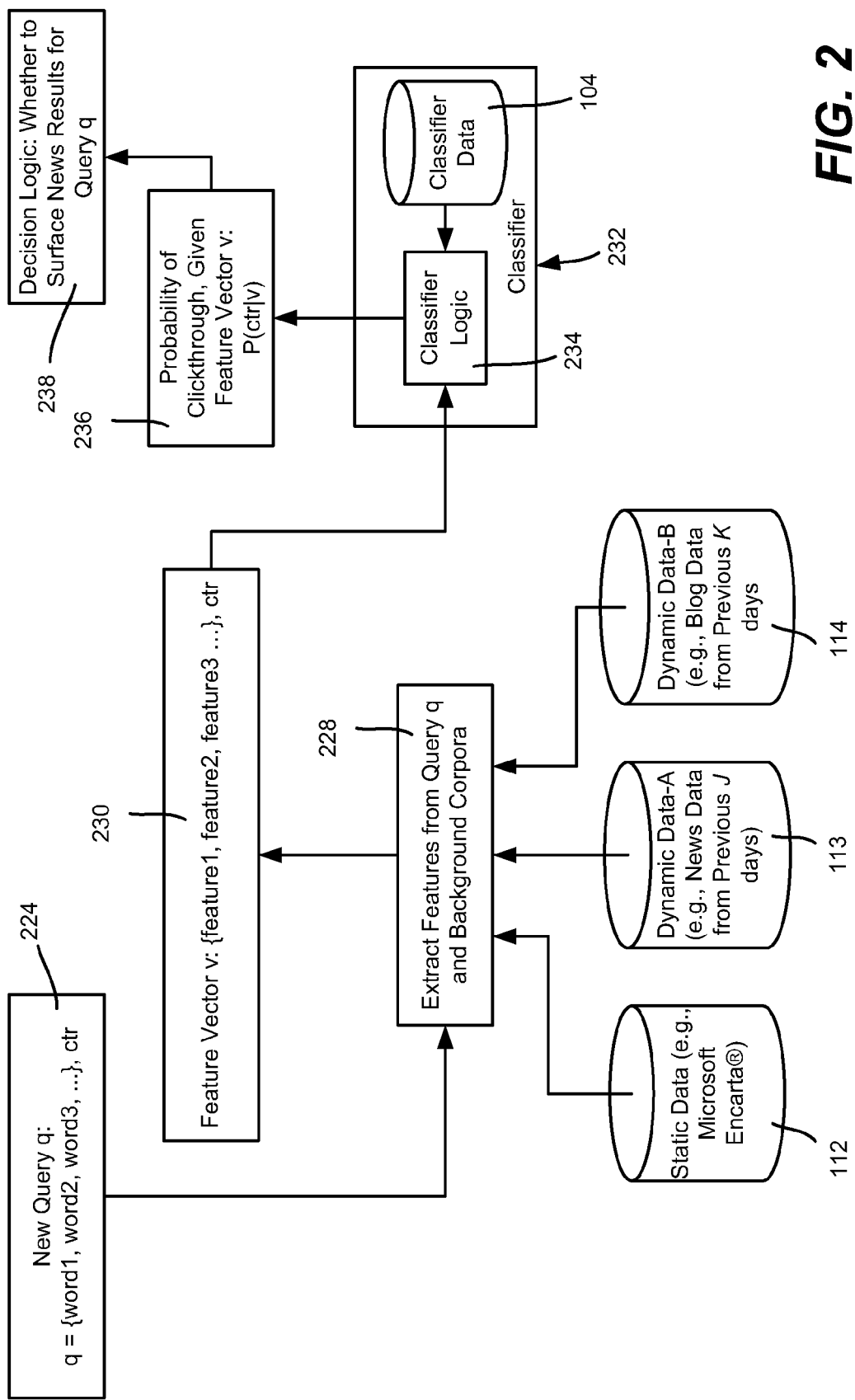
FIG. 2 is a block diagram representing example components for online processing of an input query to determine whether that query is news-related.

FIG. 2 shows the online processing of an input query 224 to determine the likelihood that the query is a news-intended query. A similar feature extraction mechanism 228 extracts features in the form of feature vectors 230 for the words of the query, again using the words themselves and the data stores 112-114.

A classifier 232 including logic 234 processes the features into a probability score 236 based on the previously (offline trained) classifier data 104. Note that one or more additional features may be used relative to those used in training, as long as the classifier logic 234 knows how to process those features.

Decision logic 238 uses the probability score 236 to determine whether to output news results (or other specialized content) for this query. The decision logic 238 can be set with a probability threshold as desired, but is typically set so that a false positive (showing irrelevant news results for a non-news query) is less likely to occur than a false negative (not showing news results for a query with news-intent). This is because in general, users dislike receiving news results for non-news-intended queries, while they are not necessarily expecting news results even with news-intended queries. Note that additional actions may be taken depending on the probability score, e.g., to determine how and where on the results page display the news results, e.g., more prominently for higher probability scores. Note that it is equivalent to include the decision logic in the classifier, e.g., the classifier can provide a yes or no decision.

Turning to the features, in order to determine whether a query has news-intent and is thus likely to result in clicks on returned news results, a number of features are specified that in general provide evidence as to whether or not a query is related to news. In one implementation, three sets of features are specified, including a query-only feature set, a query-context feature set having features based on the textual context in which the query keywords occur, and corpus frequency features. Each feature set is described below. Note that because the features need to be extracted online as queries are submitted, some consideration may be given to the extraction overhead when selecting which features to use, so that unacceptable latency does not occur.

As mentioned above, query-only features are those which capture information about the makeup of the query terms that may provide clues about the query's intent. One such feature is query length, in tokens. The presence of stop words (typically function words) is addressed by a feature that measures the ratio of stop words to the query length. In general, people/places and events tend to have a lower ratio of stop words than at least some informational queries ("movies about the end of the world").

Some queries contain non-alphabetic characters, which may indicate a non-news related query, and thus provides another feature. The count of special characters in a query and the ratio of special characters are computed. Navigational queries often contain URLs or fragments of URLs ("www.xyz.com"). Whether a query is a URL may be determined through a series of regular expressions. In addition, it straightforward to detect whether the query contains a string indicative of a navigational query (e.g., "www") or other non-news-intended query (e.g., "FAQ").

Further, capitalization of the terms that appear in a query can indicate named entities ("Barack Obama") as opposed to common nouns. However, when entering queries in a search box, many users do not use capitalization. Thus, a more suitable test is whether or not the terms occurring in a search query are typically capitalized when they occur in the news corpus. This may be set up as a pre-computation step, e.g., as the news corpus is updated, a list of terms and phrases that are commonly capitalized (e.g., ≥90% of the time) in the corpus is pre-computed. Thus, one implementation uses the number of words in the query that are typically capitalized, the ratio of such words to the query length, and the presence of a sequence of typically capitalized words as features for the classifier 232.

Turning to the other feature sets, as described above, keywords that are associated with news events are typically reflected in current corpora of news and blog articles. For example, when a news event occurs, keywords describing it are frequently found in titles of news articles published around that time. The same holds (to a lesser extent) for words or word combinations in the initial paragraphs of news or their full text.

Thus, features may be used to reflect the change in the frequency of keywords in these corpora over time, as news events are often associated with spikes in keyword frequency. These frequency-based features may be obtained by consulting various background and current event corpora to find distributional information about the query terms. In one implementation, there is a differentiation between corpus frequency features that track the number of times the keywords of a query occur in the underlying corpora over time, and query-context features that are based on the textual context in which the query keywords occur. The BM25 relevance-score for the top-scoring document also may be used as a feature in the classifier.

The frequency-based features may be extracted by analyzing the frequency and location of keywords in relatively large corpora of news articles, blogs postings, and so forth. By keeping these corpora current, the system adapts to "new" news events and changing levels of interest in older ones. The corresponding corpora are ordered by time (e.g., using the date the individual articles were posted or crawled), allowing detecting and leveraging temporal trends in the frequency with which query terms occur. Because only a relatively small window of historic news and blog articles (seven days for each, for example), the underlying text corpora and index structures are small enough to fit into the main memory of a single server, allowing for fast in-memory feature extraction as queries are processed.

Within the frequency-based features, one type describes the number of documents that match the query using set containment semantics and using phrase semantics in the news and blog corpus (e.g., how many documents in the corpora contain all the words in the query, and how many contain the query terms adjacent and in the same order as in the query). For each corpus, both of these counts as well as their difference may be used as features. For the news data, each article may be further subdivided into the article title and the full text of the article; for each of these regions, the counts may be collected separately, and used as distinct features. Further, the counts may be broken down by date, collecting separate counts for each date, going back the specified number of days into the past.

In order to assess the salience of query terms in the three corpora, the well known term frequency, inverse document frequency, or tf.idf-based metrics may be used. The tf.idf value of a token is calculated over the whole corpus as:

$$td.idf(\text{token}) = \begin{cases} 1 + \log(tf(\text{token})) \frac{N}{df(\text{token})}: & tf(\text{token}) \geq 1 \\ 0: & tf(\text{token}) = 0 \end{cases}$$

where tf(token) is the count of the tokens in the collection, df(token) is the count of documents containing the token, and N is the total number of documents in the collection. For news articles, in one implementation, the tf.idf is calculated based on three distinct parts of the articles, namely news titles, the first W (e.g., the first thirty) words of the news article, and the full body of the news article. The first W words are meant to be an approximation of the first paragraph of a news article, which typically contains a synopsis of the content of the article. Paragraph detection may alternatively (or additionally) be employed. For one set of features, the tf.idf values are averaged over all terms in a query and represented it in the following features: AvgNewsBodyTfIdf, AvgNewsTitleTfIdf, AvgNewsFirstParagraphTfIdf, AvgReferenceTfIdf.

For a second set of features, the tf.idf values are summed for the terms in the query: NewsBodyTfIdfSum, NewsTitleTfIdfSum, NewsFirstParagraphTfIdfSum, ReferenceTfIdfSum.

The textual context-related features consider the context in which the query words occur within such corpora, as the context may provide hints as to whether a query characterizes a very specific news event or only contains keywords that happen to occur across many different news stories. More particularly, even if a query phrase occurs frequently in news articles or blog posts, it is useful to have an indication of what contexts it occurs in. If the contexts are very diverse, the query is less likely to be specific. Conversely, if the contexts are very similar, this may indicate a specific usage.

To measure the diversity of contexts in which query terms in, a context is defined as a text window of T (e.g., ten) tokens to the right and left of an occurrence of a query phrase (e.g., all words in the query occurring together, in order). Taking a sample of some number (e.g., fifty) contexts per query, the overall "cohesion" of these contexts is calculated. One measure for cohesion evaluates the term vectors of the contexts, and calculates an average distance or similarity metric between the vectors. Known distance measures may be used (e.g., Jensen-Shannon, or JS divergence) and cosine similarity. Features based on context comprise AvgNewsJS and AvgBlogJS and similarly, AvgNewsCosine and AvgBlogCosine.

To expedite online processing, in general, the data that is used resides in main memory. For feature extraction, the text in the corpora itself, inverted indices on the corpora, as well as some word-level statistics (which can be encoded as part of the inverted index) are retained, plus a small set of pre-computed lists (such as stop-words and so forth). In one implementation, the blog and news corpora are maintained for a window of seven days into the past. Over time, the inverted indices are updated through a background process as new documents are crawled.

For corpus frequency features, a differentiation exists between the tf.idf-based statistics for individual words and the word set/phrase counts collected for different corpora. For tf.idf-based statistics, the term frequency and document frequency statistics for each word in the vocabulary are maintained as part of the corresponding word's entry in the inverted index. Computing the word-set counts (for multi-keyword queries) requires answering partial match queries (also known as containment queries), which are inherently expensive; the count features for word-sets or phrases are the only ones whose computation induces non-negligible overhead. To compute the counts for sets of query terms, the process uses the inverted index intersections for the indices corresponding to the query terms. Because in one implementation the corpora fits into main memory on a single server, the cost of these queries is orders of magnitude faster than for disk-based indices; however, if the resulting latency is still too large, these can be reduced further by approximating the intersection sizes or using a smaller sample of the documents in each corpus. By encoding positional information together with the postings within the inverted index, the phrase counts are computed using the inverted index intersections.

For query context features, a sample of the context in which each phrase occurs is computed using the result of the inverted index intersection and then extracting the context directly from the corresponding articles/posts. Because the corpora are kept in main memory, this extraction does not cause significant additional overhead. Moreover, only a relatively small number of contexts (e.g., fifty) are used for these features.

For query-only features, most are quickly derived from the query itself. Exceptions include the stop-word features, for which the individual words in the query are matched against a small hash-table of stop-words, and the features dealing with capitalization. For capitalization a list of capitalized words or phrases is periodically computed via a background process that iterates over the current corpus. Because the capitalization of terms does not change quickly over time, this process does not need to be triggered frequently and does not constitute a performance issue. Once computed for the phrases, the subsets of words in a query are matched against this phrase table, which corresponds to the problem of broad-match in ad-matching and can be addressed efficiently via known data structures.

Figure 3:
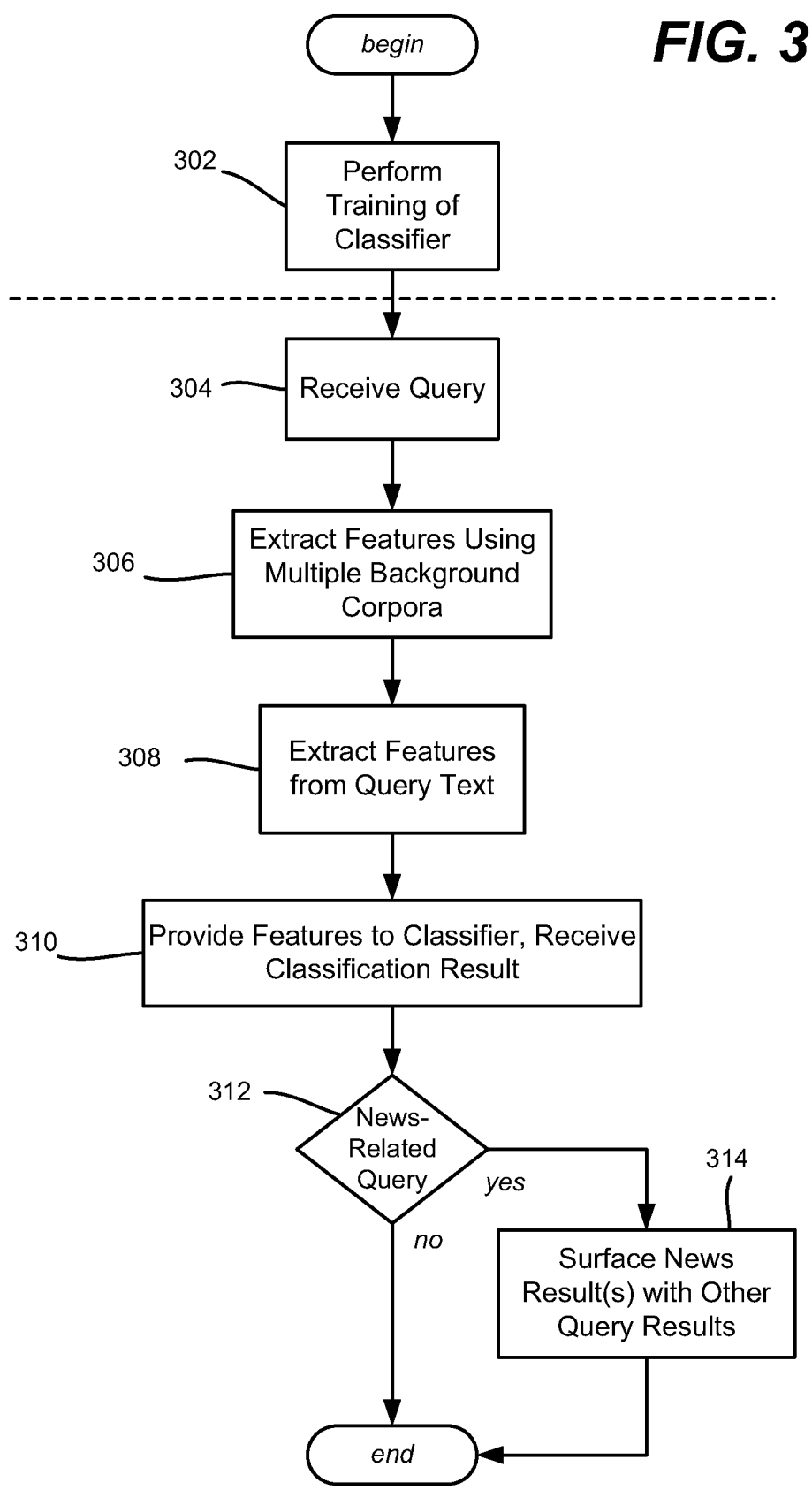
FIG. 3 is a flow diagram showing example steps taken in online processing of a query to determine whether to output specialized content (e.g., a news result) for a query including by determining whether an input query is news-related.

FIG. 3 summarizes the general online operation of the online processing of an input query to determine if the query has news intent. Note that step 302 represents the offline training operations (described below), which as indicated by the dashed line, may have occurred at any time prior to the query processing steps, although reasonably recently (e.g., within a day or some number of hours ago).

Step 304 represents receiving the input query, with step 306 representing extracting the features based upon the data in the various corpora as described above. Step 308 represents extracting the query-only features.

Step 310 provides the features to the trained classifier, which returns data (e.g., a probability score) corresponding to an estimated click through rate. Step 312 compares this data against a threshold to determine whether to output news results with the other query results (e.g., interleaved with conventional results and/or advertisements). If so, step 314 is executed and the news results appear with the other results.

Turning to training and the learning model, in one implementation, click-through rate-prediction is based on multiple additive regression-trees (MART). MART is based on the known stochastic gradient boosting paradigm, which performs gradient descent optimization in functional space. Log-likelihood may be used as the loss function (optimization criterion), the steepest-decent (gradient descent) may be used as the optimization technique, and binary decision trees may be used as the fitting function (a "nonparametric" approach that applies numerical optimization in functional space). In an iterative boosting (or residue-learning) paradigm, at the beginning of each iteration, the click probabilities of the training data are computed using the current model. The click prediction is compared with the actual click outcome to derive the errors (or residuals) for the current system; which is then used to fit a residue model (comprising a function that approximates the errors) using MSE (Mean Square Error) criteria. In MART, the derivatives of the log-loss are computed for each training data point as the residual, and the regression used tree as the approximation function-residual model. A regression tree is a binary decision tree, where each internal node splits the features space into two by comparing the value of a chosen feature with a pre-computed threshold; once a terminal node is reached, an optimal regression value is returned for all the data failing into the region. The residual model is added back to the existing model so that the overall training error is compensated for and reduced for this iteration. The new model, comprised of the current plus the residual model, is used as the current model for the next boosting/training iteration. The final model after M boosting iterations is the sum of the M regression trees built at each iteration.

The following pseudo-code summarizes the MART algorithm (as also described in U.S. Provisional Patent Application Ser. No. 60/999,638, filed Oct. 19, 2007, entitled "Boosting a Ranker for Improved Ranking Accuracy"):

```
1:   F_0(x) = 0
2:   for m = 1 to M do do
3:       for i = 1 to N do do
4:           p_i = 1/(1 + e^{-F_{m-1}(x_i)})
5:           ŷ_i = y_i - p_i
6:           w_i = p_i · (1 - p_i)
7:       end for
8:       {R_{lm}}_1^L = L-Terminal node tree
9:
             r_{lm} = ∑_{x_i ∈ R_{lm}} ŷ_i / ∑_{x_i ∈ R_{lm}} w_i 10:
             F_m(x_i) = F_{m-1}(x_i) + v ∑_l r_{lm} I(x_i ∈ R_{lm})

11:  end for
```

In general, the MART algorithm assumes there are N total query-impressions in the training set and that M stages (trees) are to be trained. The training data is a set of input/output pairs $\{x_i, y_i\}$; i=1 . . . N, where $x_i$ is the feature vector of a query and $y_i$ equals 1 if a query impression resulted in a click on news results and 0 otherwise. M iterations of boosting are performed, and at each boosting iteration, a regression tree is constructed and trained on the queries.

Step 1 initializes the functional value of the data points to 0, while steps 2 and 3 represent the stage iterations and the looping through the queries in each stage, respectively.

Step 4 computes the probability of the query being clicked from its functional value. Step 5 calculates the log-likelihood gradients for query. Step 6 calculates the second-order derivative. A regression tree with L terminal nodes is built in step 8, using Mean Squared Error to determine the best split at any node in the regression tree. The value associated with a given leaf of the trained tree is computed first as the mean of the gradients for the training samples that land at that leaf. Then, since each leaf corresponds to a different mean, a known one-dimensional (Newton-Raphson) line step is computed for each leaf (step 9).

At step 10, the regression tree is added to the current boosted tree model, weighted by the shrinkage coefficient v, which is chosen to regularize the model. MART thus has three main parameters: M, the total number of boosting iterations, L, the number of leaf nodes for each regression tree, and v, the "shrinkage coefficient"—comprising the fraction of the optimal line step taken. Using a shrinkage coefficient with a value less than one is a form of regularization. In one implementation, the number of iterations M=600, the number of leaf nodes in an individual decision tree L=5, and the shrinkage coefficient v=0.1.

Further, randomness may be injected into MART to improve the robustness; in one implementation, an effective method introduces the randomness at the node level. Before each node split, a subsample of training data and a sub-sample of features are drawn randomly. Then, the two randomly selected sub-samples, instead of the full samples, are used to determine the best split.

MART is very tolerant regarding the diverse sets of features described above. MART does not require transformations to normalize the inputs into zero mean and unit variance (unlike other algorithms such as logistic regression or neural nets). MART's internal use of decision trees, which are able to "break" the domain of each feature arbitrarily, make it able to handle the non-linear dependencies between the feature values and the click-through rate easily and without resorting to explicit binning as a preprocessing step. MART also computes the importance of a feature by summing the number of times it is used in decision splitting weighted by the MSE gain this split has achieved. The relative importance of a feature is computed by normalizing its importance by the importance of the largest feature. Therefore, the "most important" feature will have the relative importance of 1 and other features have relative importance between 0 and 1. The relative importance of input features makes the model interpretable, providing an understanding of the input variables that are most influential to the final decision and the nature of the dependency on these features. Alternatives to MART include a Logistic Regression model as well as Averaged Perceptron) on the same data.

Exemplary Operating Environment

Figure 4:
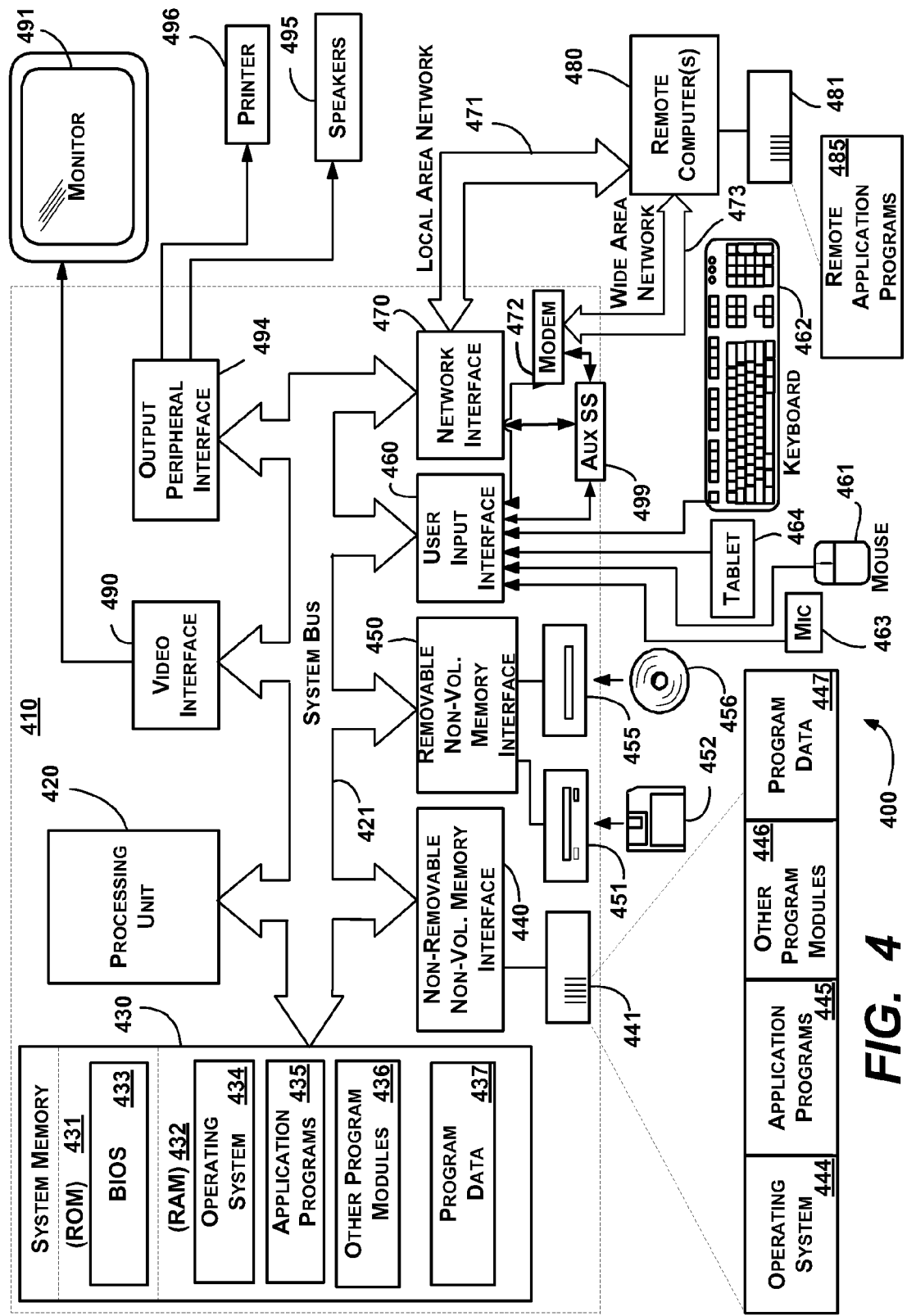
FIG. 4 shows an illustrative example of a computing environment into which various aspects of the present invention may be incorporated.

FIG. 4 illustrates an example of a suitable computing and networking environment 400 into which the examples and implementations of any of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method executed at least in part on at least one processor, comprising: receiving a query; extracting features related to the query that comprise a context feature set, and a frequency feature set, the context feature set comprising textual context-related features of query keyword data in news items, the frequency feature set comprising keyword frequency data in the news items; using the features to estimate whether the query is a news-related query, including by providing the features to a classifier that is built by referencing data that corresponds to news items updated within a preset time period with at least one data source that has not been updated within the preset time period, and by detecting temporal changes associated with the data that corresponds to news items updated within the preset time period; receiving classification output corresponding to a predicted click-through rate from the classifier; estimating from the classification output whether the query is a news-related query; and outputting results based at least in part on the estimate of whether the query is news-related.

2. The method of claim 1 wherein extracting the features related to the query comprises evaluating at least one word in the query against frequency information in the data that corresponds to news items updated within the preset time period.

3. The method of claim 1 wherein extracting the features related to the query comprises evaluating at least one word in the query against context information in the data that corresponds to news items updated within the preset time period.

4. The method of claim 1 wherein extracting the features related to the query comprises processing text of the query.

5. The method of claim 1 further comprising obtaining the data that corresponds to the news items updated within the preset time period by accessing at least one data store comprising a corpus of events crawled from news sources.

6. The method of claim 1 further comprising obtaining the data that corresponds to the news items updated within the preset time period by accessing at least one data store comprising a corpus of events crawled from blogs.

7. The method of claim 1 wherein using the features to estimate whether the query is a news-related query includes accessing at least one data store comprising a corpus of reference data, comparing the features to data from the data store and to the data that corresponds to news items updated within the preset time period, and determining whether the data from the data store or the data that corresponds to news items updated within the preset time period provide a better match.

8. The method of claim 1 further comprising obtaining the data corresponding to the news items updated within the preset time period by accessing a corpus of events crawled from news sources and a corpus of events crawled from blogs.

9. The method of claim 1 further comprising training the classifier.

10. The method of claim 1 wherein the query is estimated to be a news-related query, and wherein the outputting the results includes outputting at least one news result in association with other results provided in response to the query.

11. In a computing environment, a system comprising, at least one processor, a memory communicatively connected to the at least one processor and including components comprising, a feature extraction mechanism configured to obtain features for a search query in which the features comprise a query-only feature set, a query-context feature set comprising textual context-related features of query keyword data, and a corpus frequency feature set comprising features tracking one or more query keywords over time, a classifier configured to output classification output based upon the features and constructed by detecting changes between dynamic data from at least one data source that has been updated within a configurable time period and static reference data from at least one other data source that has not been updated within the configurable time period, the classification output corresponding to a probability that specialized content will be clicked on if returned, and decision logic that uses the classification output to determine whether to return the specialized content as part of a set of results returned in response to the query.

12. The system of claim 11 wherein the feature extraction mechanism is further configured to obtain some of the features based upon a corpus of events crawled from blogs.

13. The system of claim 11 wherein the feature extraction mechanism is further configured to obtain some of the features based upon a corpus of reference data.

14. The system of claim 11 wherein the classifier comprises a multiple additive regression-trees classifier.

15. The system of claim 11 wherein the feature extraction mechanism is further configured to obtain a query-only feature set, a frequency-related feature set, and a context-related feature set.

16. The system of claim 11 further comprising, means for updating the corpus of events.

17. One or more computer-readable storage memories having computer-executable instructions stored thereon, which in response to execution by a computer, cause the computer to perform steps comprising: extracting features related to a search query in which the features comprise a query-context feature set comprising textual context-related features of query keyword data, and a corpus frequency feature set comprising counts of one or more query keywords in news items and web items over time; providing the features to a classifier, the classifier returning classification data that corresponds to an estimate of whether the query is a news-related query, including by accessing data that corresponds to news items that have been updated within a period of time, by accessing other data that corresponds to web items that have not been updated within the period of time, and by detecting temporal changes between the data and the other data; and when the query is estimated to be a news-related query, outputting at least one news result in response to the query.

18. The one or more computer-readable storage memories of claim 17 having further computer-executable instructions stored thereon, which in response to execution by a computer cause the computer to perform further steps comprising training the classifier to output the classification data as a probability value that corresponds to a predicted click-through rate.

19. The one or more computer-readable storage memories of claim 17 wherein extracting the features comprises accessing frequency-related data, context-related data and processing text of the query, wherein at least some of the frequency-related data context-related data is obtained by accessing a corpus of events crawled from news sources, a corpus of events crawled from blogs, and a corpus of reference data.

* * * * *